June 19, 1956 H. J. ZIEMANN 2,750,678
SPIRIT LEVEL
Filed Sept. 25, 1952
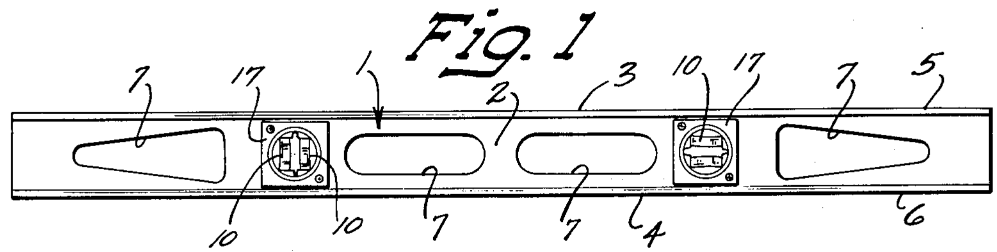
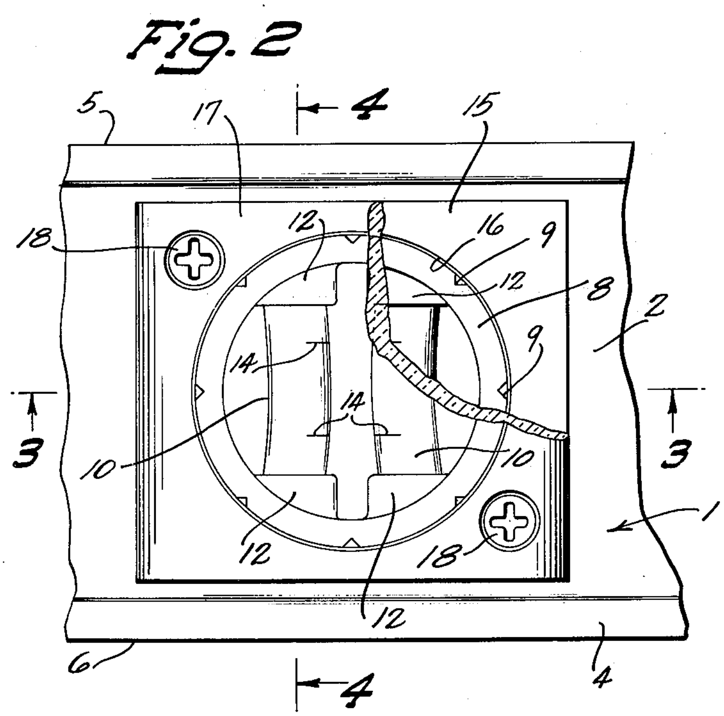
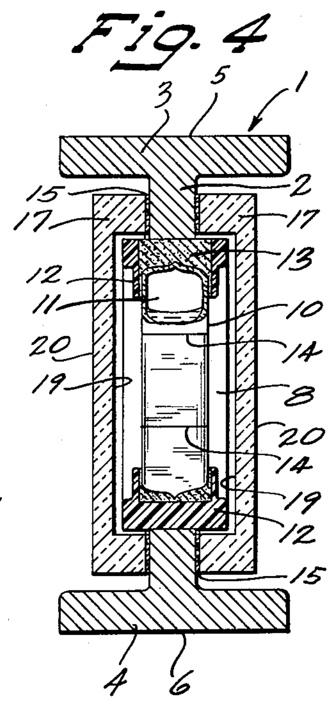
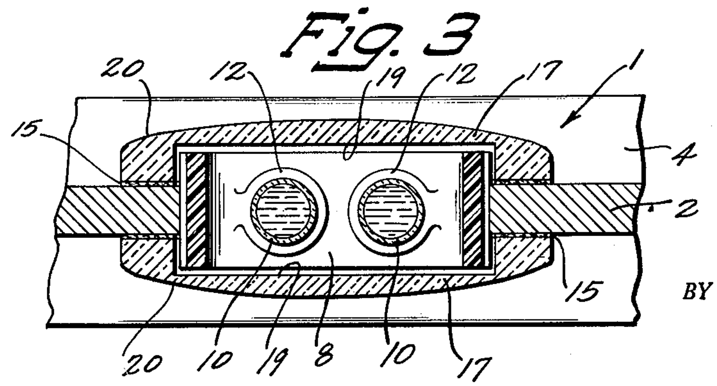
INVENTOR.
Harry J. Ziemann
BY
David A Fox
Attorney 2,750,678

SPIRIT LEVEL

Harry J. Ziemann, Elm Grove, Wis.

Application September 25, 1952, Serial No. 311,477

2 Claims. (Cl. 33—211)

This invention relates to levels and it more specifically resides in a level having a vial case with vial and bubble set in a frame and enveloped on each side of the frame by a pair of cover glasses that are mounted upon the opposite sides of the frame and are each spaced from the vial case to avoid contact therewith, which cover glasses are formed with transparent sighting areas through which the vial and bubble may be observed of substantially cylindrical configuration to produce a rectilinear distortion of distant objects observable through the sighting areas when observing bubble position.

When observation of the vial bubble position in a spirit level is made with the eye of the observer within normal observing range of approximately 25 to 50 centimeters, distraction by the outlines and configuration of background objects occurs, and when observed from greater distances distraction increases.

It is an object of this invention to provide a level in which the images of background objects observable through the sighting areas of the cover plates upon inspection of the bubble are less distinct than the natural optical properties of the eye demand.

It is another object of this invention to provide a level that diffuses the images of distant objects observable through the vial case cover plates but in which objectionable distortion of the bubble image does not occur.

It is still another object of this invention to provide a level having cover glasses enveloping the vial case that may be replaced or removed without disturbance of the setting of the vial case assembly.

It is a further object of this invention to provide cover glasses for the vial case that sustain impact without harm and which will transmit the shock thereof direct to the level frame rather than the vial case.

It is still a further object of this invention to provide a level having a cover glass for a vial case that completely envelops the same but is disposed out of contact therewith and which is attached to the frame of the level.

These and other objects and advantages will appear in the description to follow. In the description reference is made to the accompanying drawing in which there is shown by way of illustration and not of limitation a specific form in which this invention may be embodied.

In the drawing:

Fig. 1 is a front view in elevation of a level embodying this invention,

Fig. 2 is an enlarged fragmentary front view in elevation with parts broken away and in section of the level shown in Fig. 1 depicting a vial case assembly, Fig. 3 is a fragmentary plan view in section of the level shown in Fig. 1 viewed through the plane 3—3 in Fig. 2, and Fig. 4 is a side view in elevation and in section of the level shown in Fig. 1 viewed through the plane 4—4 in Fig. 2.

Referring now to the drawing, there is provided a level frame 1 having a vertical web 2 of thin cross section with which are merged upper and lower flanges 3 and 4. The top and bottom faces 5 and 6 of the flanges 3 and 4 respectively are precision machined to form a pair of parallel plane surfaces upon which the level rests when level or plumb readings are made. To reduce the weight of the level and to provide convenient hand grips a number of apertures 7 are cut into the web 2.

A pair of circular vial cases 8, one of which is shown in Figs. 2, 3 and 4, are disposed in suitable openings in the web 2 with a press fit and a number of notches 9 are disposed about the periphery of each of the vial cases 8 to provide a means for grasping the cases 8 and positioning them with respect to the frame 1.

Prior to press fitting the vial cases 8 into the web 2 a pair of glass vials 10 that are closed at each end to hold captive sufficient liquid to form the bubbles 11 are set in socket thimbles 12. The thimbles 12 form an integral part of each of the vial cases 8 and comprise two sets of pairs for each case 8, with those constituting a pair having openings aligned to receive the opposite ends of a vial 10. A slow setting cement 13 is packed in the thimbles 12 and as the cement 13 sets the vials 10 are adjusted to proper position, so that each bubble 11 will align with a pair of etched marks 14 on the respective vial 10 upon the level being disposed in either of the level or plumb positions as the case may be.

Rectangular gaskets 15 with central circular openings 16 of diameter greater than that of the vial cases 8 are disposed on opposite sides of the web 2 and encircle the cases 8. Mounted upon the gaskets 15 are cover glasses 17 and mounting screws 18 pass through the glasses 17 and gaskets 15 for threaded engagement with the web 2 to retain the glasses 17 and gaskets 15 in place. Each cover glass 17 is recessed from the inner side to provide a circular cavity 19 the surfaces of which are spaced from and envelop the adjacent vials 10 in case 8. The outer face 20 of each cover glass 17, through which bubble position is observed, is cylindrical in form to refract in the manner of a cylindrical lens having a principal focal length substantially greater than its spacing from the vials 10 which are enclosed. For this purpose clear plastic substances having a comparataively low refractive index chosen for physical strength and resistance to impact is preferably employed in making up the cover glasses 17. As shown in the drawing, the described setting of the slightly curved vials positions them generally parallel to the generatrix of the cylindrical surfaces of the cover glasses.

In observing bubble position and when adjusting a work piece to bring a bubble 11 into alignment with the etched marks 14 the background objects also observable through the vial case 8 will be diffused by reason of the cylindrical configuration of the cover glasses 17. The confusion of the background images thus produced in comparison with the sharp image of the vial and bubble at all distances within normal reading range markedly reduces the visual distraction caused by the background and the bubble may therefore be read with greater ease. The confusion of the background is enhanced by the light passing through a pair of cover glasses, while the vial and bubble are observed through but one glass.

The cylindrical configuration furthermore causes reflections of objects to the side and rear of the observer to be distorted for related reasons and the distracting effect of the same to be thus minimized.

The curvature of the cover glass while providing sufficient diffusion of the remote background causes only a minor distortion of the bubble and etched marks. The distortion that is caused by the cylindrical outer surfaces of the glasses 17 is rectilinear in nature. This rectilinear distortion is oriented along coordinates either parallel or normal to the surfaces 5 and 6 of the flanges 3 and 4 and does not cause any significant aberration in the reading of the bubble outline in relation to the etched lines.

The glasses 17 envelop the cases 8 but are nowhere in contact with the same and thus provide a protective shield which isolates the sensitive parts from the shocks which otherwise might be transmitted thereto in the course of the use to which a level is normally subjected. Further, such shocks are cushioned partially by the gaskets 15 that may be of a resilient material.

I claim:

1. In a level the combination comprising an elongated frame, an aperture in said frame extending through said frame, a vial case having an open center disposed in said aperture and secured to said frame, a spirit level vial secured in said vial case transversing the open center thereof to be observable from either side thereof, said vial case and said frame adjacent thereto having a thickness not exceeding approximately twice the diameter of said vial, the open center of said vial case being large in relation to the diameter of said vial to permit inspection of said vial at a substantial angle of obliquity with respect to said frame, and a pair of cover glasses on the opposite sides of said vial case secured to said frame and spaced from one another a distance not exceeding approximately twice the diameter of said vial, each said cover glass having an outer cylindrical convex surface and an inner flat surface adjacent said vial constituting said cover glass a cylindrical lens, the radius of curvature of the cylindrical surface of said cover glass being large in relation to the spacing between said cover glasses and the average thickness of said cover glasses being small in relation to said radius of curvature, said cylindrical surface extending uninterruptedly, laterally, substantially, entirely across the opening in said vial case whereby free passage of light through said vial case to illuminate said vial is permitted while a defined image of said vial rectilinearly magnified is observed through said cover glass against a background consisting of diffused images of background objects located beyond the principal focal distance of the two cover glasses as a combined optical unit.

2. A level as defined in claim 1, wherein the vial is generally parallel with respect to the generatrix of the cylindrical surfaces of said cover glasses.

References Cited in the file of this patent

UNITED STATES PATENTS

| | | |
|---|---|---|
| 1,090,776 | Boyce | Mar. 17, 1914 |
| 1,190,229 | Frank | July 4, 1916 |
| 1,501,504 | Truax | July 15, 1924 |
| 1,777,429 | Charlton | Oct. 7, 1930 |
| 1,892,745 | Bolick | Jan. 3, 1933 |
| 2,118,470 | Melvin | May 24, 1938 |
| 2,495,646 | Schultes | Jan. 24, 1950 |